UNITED STATES PATENT OFFICE.

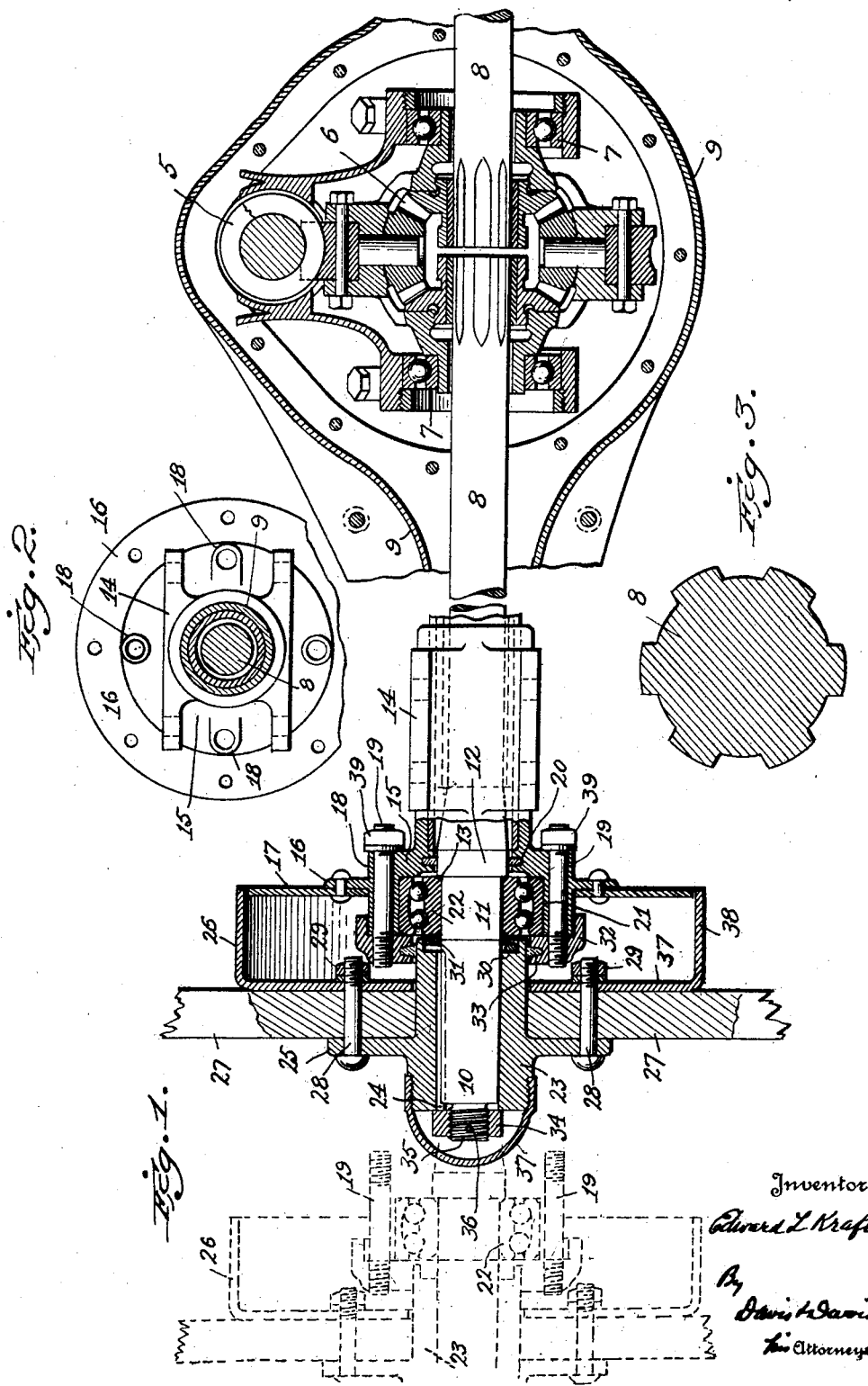

EDWARD L. KRAFT, OF YORK, PENNSYLVANIA, ASSIGNOR OF ONE-HALF TO A. R. COSGROVE, OF YORK, PENNSYLVANIA.

DEMOUNTABLE DRIVE MECHANISM FOR AUTOMOBILES.

1,400,170.   Specification of Letters Patent.   Patented Dec. 13, 1921.

Application filed July 1, 1920. Serial No. 393,333.

*To all whom it may concern:*

Be it known that I, EDWARD L. KRAFT, a citizen of the United States of America, and a resident of York, county of York, and State of Pennsylvania, have invented certain new and useful Improvements in Demountable Drive Mechanism for Automobiles, of which the following is a full and clear specification.

This invention relates to improvements in demountable drive mechanism for automobiles and has for one of its objects to provide a hub-bearing construction which is simple and easily demountable when it is desired to repair any of its parts or to detach the driving-axle from the usual driving-gear.

A further object is to provide a hub-bearing and drive-axle construction wherein the bearing is so related and attached that, when the hub and axle are displaced axially, the bearing will be carried therewith as a unit.

These and other objects are attained by the means illustrated in the accompanying drawing, in which—

Figure 1 is a vertical sectional view showing one of the rear hubs and driving-axles assembled in connection with the driving-gear;

Fig. 2 is a detail end view of the combined spring-chair and brake support;

Fig. 3 is a detail sectional view of the inner end of the driving-shaft.

Similar reference-numerals in all of the figures of the drawing designate like parts.

The type of driving-gear shown is the worm drive, which consists of the usual worm 5 and the compensating driving-gear 6 having bearings 7 at each side of the medial line thereof which form bearings for the inner ends of the drive-shafts or axles 8. The compensating-gear and axles are inclosed in a suitable casing 9, and the same extends outwardly to near the spindle-end of the axles. Each of the axles is formed at its outer end with a tapered hub-receiving spindle 10, a bearing-portion 11, and a packing-portion 12 slightly larger in diameter than said bearing-portion 11, to form a shoulder 13, for the purpose hereinafter described.

Upon the outer end of the casing 9 is fixed, in any suitable manner, the combined spring-chair 14 and bearing-housing 15, to which the brake mechanism (not shown) is fixed. This combined member 14 and 15 may be formed with a circular flange 16, to which (preferably by rivets) the inner side 17 of the brake-casing is secured, and is provided with bosses 18 having apertures to receive the bolts 19 and also an internal groove to hold a packing 20 which is adapted to bear upon the portion 12 of the axle. It is also recessed at 21 to receive the race ways of the bearing 22 the inner one of which engages the portion 11 of the axle.

The hub 23 is provided with a key 24 which engages the spindle-portion 10 of the axle, so that the hub will rotate with the axle, and is also formed with a circular flange 25, between which and a circular brake-casing 26 are supported the spokes 27, said spokes and brake-casing being held in position by the bolts 28, the nuts 29 of which are located within the brake-casing. An annular recess 30 is formed at the inner end of the hub, which is adapted to hold a spring-washer 31 which is forced into engagement with the inner race-way of the bearing 22.

A retaining-cap 32 is provided for the outer race way of the bearing, and the same is retained in position by the studs 19 and is provided with an internal groove to support a packing 33 which engages the periphery of the hub adjacent its inner end.

The hub and bearing 22 are retained in position upon the axle by the hub-nut 34, which confines said parts against the shoulder 13, said nut engaging a threaded projection 35 of the axle and being preferably prevented from loosening by a lock-pin 36. A hub-cap 37' is screwed upon the outer end of the hub and incloses the outer end of the axle and the nut 34. Casing 26 is formed with a wall 37 which engages the spokes and a wide circular flange 38 which extends inwardly preferably far enough to surround the inner wall 17, so that a complete closed brake-drum casing is provided.

In operation, when the axle is driven, the wheel turns therewith through the key 24, and the inward pressure of the hub through the spring-washer 31 against the inner race-way of the bearing 22 causes it to turn therewith. The outer race-way is held stationary by the cap 32, which is secured to the bearing-housing member 15 and this member is rigidly supported upon the outer end of the casing 9.

To separate the wheel and its axle in an axial direction from the fixed casing and the driving-gear, respectively. nuts 39 are removed from the studs 19, and then the axially-movable parts can be slipped from engagement with the fixed parts, as shown by dotted lines in Fig. 1 of the drawing. Thus it will be seen that the bearing for the outer end of the axle is removed as a unit with the hub and wheel, and at the same time the brake-drum is also removed, thereby affording ready access to the brake band, not shown. Or the cap 37' can first be removed, and then, by releasing pin 36 and nut 34, the wheel-hub can be slipped from the axle, thereby exposing the bearing 22 and its housing, so that, should the bearing need repairing, the cap 32 can be detached from the outside by reaching over and removing the nuts 39 from the studs 19.

One of the important features of the invention lies in forming the bearing-housing 15 and the spring-seat 14 integral or combined and mounting them upon the permanently-mounted casing 9. Thus the spring-seat or chair is formed as an extended portion of the bearing-housing and provides a substantial support therefor.

The nature and scope of the invention having been thus indicated and its preferred embodiment having been specifically described, what is claimed as new is:

1. In an automobile, a drive-axle provided with a shoulder, an axle-casing surrounding said axle, a bearing engaging said shoulder, a hub on the axle retaining the inner-race-way of the bearing against the shoulder, a bearing-housing fixed to the end of the axle-casing, a retaining cap for the outer-race-way of the bearing, and fastening means for securing said retaining-cap to said bearing-housing from the outside, said fastening means also holding the axle carrying the wheel in driving relation.

2. In an automobile, a drive axle provided with a shoulder, an axle-casing surrounding said axle, a bearing engaging said shoulder, a hub on the axle for retaining the inner-race-way of the bearing against the shoulder, a combined bearing-housing and spring-chair affixed to the end of the axle-casing, a retaining-cap for the outer race-way of the bearing, and external fastening means for securing said retaining-cap to said bearing-housing, said fastening means also holding the axle with the hub in driving position.

3. In an automobile, a drive-axle provided with a shoulder, an axle-casing surrounding said axle, a bearing engaging said shoulder, a hub on the axle for retaining the inner-race-way of the bearing against the shoulder, a spring-washer interposed between said hub and inner-race-way, a bearing-housing affixed to the end of the axle-casing, a retaining-cap for the outer-race-way of the bearing, and an external fastening means for securing said retaining-cap to said bearing-housing, said fastening means also holding the axle with the hub in driving position.

4. In an automobile, a drive-axle provided with a shoulder, an axle-casing surrounding said axle, a bearing engaging said shoulder, a hub on the axle having a recess at its inner end for retaining the inner-race-way of the bearing against the shoulder, a spring-washer interposed in said recess between said hub and inner-race-way, a bearing-housing affixed to the end of the axle-casing, a retaining-cap for the outer-race-way of the bearing, and external fastening means for securing said retaining-cap to said bearing-housing, said fastening means also holding the axle with the hub in driving position.

In testimony whereof I hereunto affix my signature.

EDWARD L. KRAFT.